C. G. MYERS.

LAMP.

APPLICATION FILED NOV. 5, 1915.

Reissued Mar. 7, 1916.

14,083.

2 SHEETS—SHEET 1.

Witnesses

F. L. Griswold.

H. C. Adams.

By

Inventor

C. G. Myers

Chas. A. Billman

Attorney

C. G. MYERS.

LAMP.

APPLICATION FILED NOV. 5, 1915.

Reissued Mar. 7, 1916.

14,083.

2 SHEETS—SHEET 2.

Witnesses

H. Griswold.

F. E. Adams.

Inventor

C. G. Myers

By Obed B. Billman

Attorney

UNITED STATES PATENT OFFICE.

CHARLES G. MYERS, OF CLEVELAND, OHIO.

LAMP.

14,083. Specification of Reissued Letters Patent. Reissued Mar. 7, 1916.

Original No. 1,077,153, dated October 28, 1913, Serial No. 660,326. Application for reissue filed November 5, 1915. Serial No. 60,660.

*To all whom it may concern:*

Be it known that I, CHARLES G. MYERS, a citizen of the United States, residing at Cleveland, in the county of Cuyahoga and State of Ohio, have invented certain new and useful Improvements in Lamps, of which the following is a specification.

My invention relates to improvements in lamps, and more particularly to that class or type which are adapted to concentrate and project the rays of light from a suitable source of illumination through the medium of one or more lenses.

My invention is particularly designed and adapted for use in connection with such lamps as automobile lamps, theatrical or "spot" lamps, and the like, the primary object of the invention being to intercept or cut off certain of the direct rays of light from the projected field which would otherwise reach the eyes of the person in such projected field of light, as for example, the chauffeur or occupant of an oncoming automobile, or the performer in the spot light as the case may be.

In carrying out my invention a portion of one lens is provided with an intercepting element (preferably the objective lens where two lenses are employed) whereby certain rays of light are intercepted or cut off from the projected field.

With the above mentioned and other ends in view, the invention consists in the novel construction, arrangement, and combination of parts, hereinafter described, illustrated in some of its embodiments in the accompanying drawings, and particularly pointed out in the appended claims.

Figure 1:
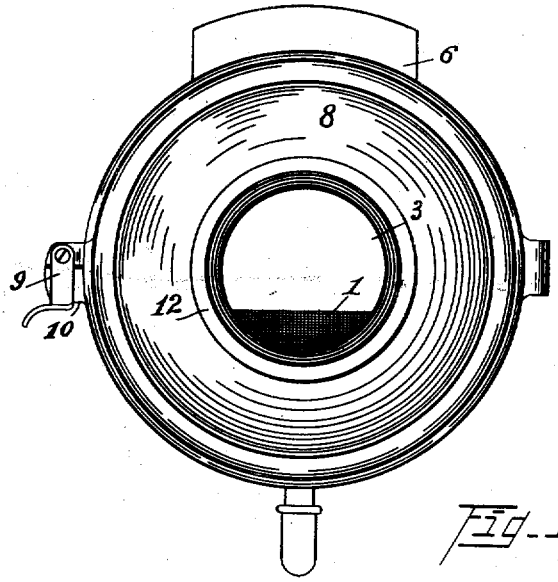
Figure 2:
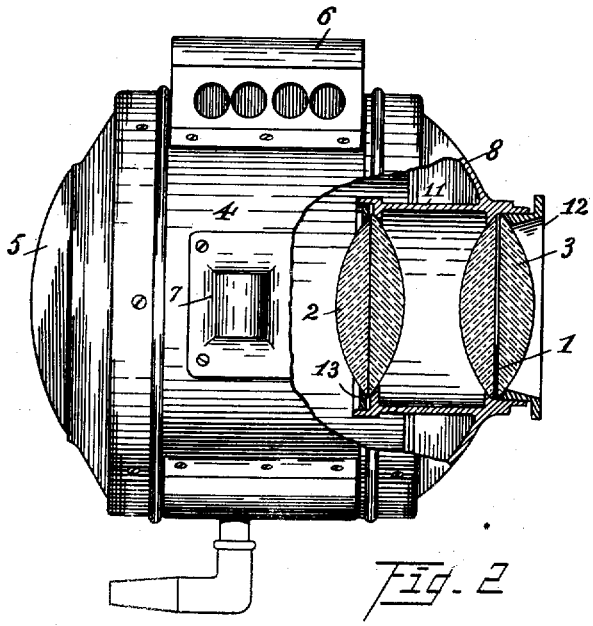
Figure 3:
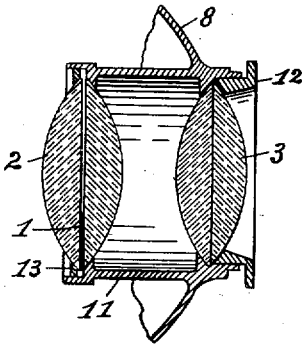
Figure 4:
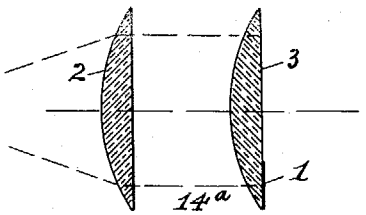
Figure 5:
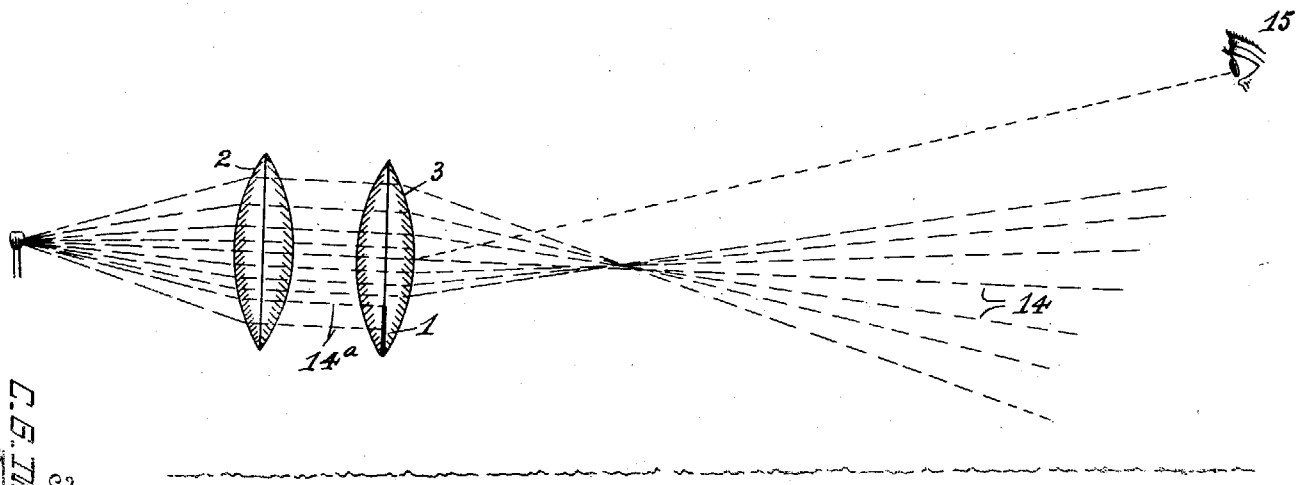

Referring to the drawings forming a part of this specification, Figure 1, is a front elevation of an automobile lamp constructed in accordance with my invention. Fig. 2, a side elevation of the same, a portion of the lamp casing being broken away and the lens tube and lenses being shown in section for the purpose of clearer illustration of the parts. Fig. 3, a detached longitudinal sectional view showing the application of the shading or intercepting element to the rear or condensing lens. Fig. 4, a diagrammatic view of a further modified form in which two plano-convex lenses are employed, one being provided with a shading or intercepting element. Fig. 5, a diagrammatic view illustrating the refraction and projection of the rays of light and the manner in which certain rays are intercepted or cut off from the eye in the projected field.

Similar numerals of reference designate like parts throughout all the figures of the drawings.

In carrying out my invention for the purpose of cutting out or intercepting certain rays of light from the projected field whereby the eye does not receive the glare or dazzle arising from the direct rays of light emitted from the source of illumination, I prefer to provide a portion of a lens with a suitable shading or intercepting element, of suitable opaque or translucent material adapted to intercept or cut out certain rays of light as shown in Figs. 1, 2, 3, 4 and 5, of the drawings. Where a condensing lens 2, and objective lens 3, are employed as shown in the embodiments of my invention illustrated in the accompanying drawings, I prefer to cut out or intercept certain rays of light at one side of the objective lens 3, by the addition or introduction of a suitable shading or intercepting element 1.

The condensing lens 2, and objective lens 3, may be of any suitable and convenient form, and where employed in connection with an automobile lamp as shown in Figs. 1, 2, and 3, each lens may comprise two plano-convex members with the shading or intercepting member 1, interposed between the adjacent or plane sides of the plano-convex members as shown.

The improved automobile lamp embodying my invention comprises a suitable lamp body or casing 4, preferably provided at its rear with a concavo-convex shaped back 5, which may form a reflector at the rear of the source of illumination. When used in connection with a gas burner, as shown, the casing may be provided at its top with the usual ventilated dome 6, and the lamp body may be supported by means of supporting lugs or sleeves 7, adjustably secured upon the usual bracket arms in any suitable and convenient manner.

The lamp body or casing 4, is preferably provided at its front with a door or closure 8, hinged at one side and secured in its closed position by means of a pivoted latch member 9, taking over or interlocking with a lug 10, of the lamp body 4. The pivoted door 8, is preferably of concavo-convex shape as shown, and is provided with a lens tube 11, adapted to extend rearwardly into the lamp body and to carry a condensing lens 2, and an objective lens 3. The objective lens 3, may be retained and secured in position by means of a flanged lens collar or sleeve 12, and the condensing lens may be similarly secured at the rear by means of a lens holder or retaining ring 13.

An automobile lamp having its parts constructed and arranged as above described will project the rays of light in a manner similar to that illustrated in Fig. 5, of the drawings, the projected rays 14, extending forwardly to illuminate the roadway substantially as shown, while the rays 14[a], coming from the condensing lens 2, are intercepted or cut off by the intercepting agent 1, so that these rays which would ordinarily be projected directly into the eye 15, in the upper portion of the field of light are cut off, thus relieving the eyes of the chauffeur or occupant of an oncoming automobile from the direct rays of the source of illumination and the glare or dazzle incident to the use of the ordinary form of automobile lamp.

If desired, the intercepting agent 1, may be formed with or carried by the rear or condensing lens 2, as shown in Fig. 3, but this form does not give such good results and is considered as an inferior modification.

Fig. 5, of the drawings illustrates also the use of my invention for use in connection with a theatrical or "spot" light and the manner in which the rays of light are projected and certain rays cut out of the projected field.

Although certain direct rays are cut out of the upper portion of the projected field of light as illustrated in Fig. 5, of the drawings, said upper portion of the projected field is not materially darkened or the intensity of the light materially diminished as compared with the other portions of the projected field.

From the foregoing description, taken in connection with the accompanying drawings, the operation and advantages of my invention will be readily understood.

Having thus described some of the embodiments of my invention, what I claim and desire to secure by Letters Patent is,—

1. In a light concentrator and projector, a condensing lens, an objective lens, and a light intercepting element at one side of one of said lenses and adapted to cut out certain rays of light from the projected field.

2. In a light concentrator and projector, an objective lens having an opaque segmental portion.

3. A lamp, comprising a casing, a source of illumination, a condensing lens and a convex lens having a portion adapted to cut out certain rays of light from the projected field.

4. In a light concentrator and projector, the combination with a lens tube provided with a condensing lens; of an objective lens having its lower portion provided with light intercepting means.

5. A lamp, comprising a casing, a source of illumination, a condensing lens, and an objective lens having an intercepting portion at one side adapted to cut off some of the direct rays of light from said condensing lens.

6. A lamp, comprising a casing, a source of illumination, a lens tube provided with a condensing lens and an objective lens, and a shading element carried by one of said lenses whereby certain rays of light are cut off from the projected field.

7. A lamp, comprising a casing, a source of illumination, a lens support, a condensing lens, an objective lens, and an opaque segmental portion at the lower edge of the latter.

8. A lamp, comprising a casing, a source of illumination, a lens tube extending into said casing and provided with a condensing lens, and an objective lens having its lower marginal portion provided with light intercepting means.

9. A lamp, comprising a casing provided at its rear with a reflector, a source of illumination, a lens support extending into said casing and provided with a condensing lens in close proximity to said source of illumination, an objective lens comprising two plano-convex members mounted at the front of said lens support, and an intercepting element between the lower marginal portions of the members of said objective lens.

10. In a light concentrator and projector, including a source of illumination, and a condensing element, a light intercepting element positioned below the axis of the projector cutting out the projected rays of light from a portion of the projected field.

11. In a light concentrator and projector including a source of illumination, and a condensing element, a light intercepting element below the axis of the latter and said source of illumination cutting out the projected rays of light from the upper portion of the projected field.

12. In a light concentrator and projector, including a source of illumination, and a condensing element, a light intercepting element between a portion of the latter and said source of illumination cutting out the projected rays of light from a portion of the projected field.

13. In a lamp, including a source of illumination, and objective and projecting elements on opposite sides thereof, a light intercepting element interposed below the plane of said source of illumination and between the lower sides of said projecting and objective elements and intercepting a portion of the beam of light between the latter thereby cutting out the projected rays of light from the upper portion of the projected field.

14. In a projector, the combination of a reflector adapted to project an approximately concentrated beam of light, an objective, a light source located therebetween in the same axial plane, and a light intercepting element interposed between said reflector and objective and intercepting the projected beam below said light source and the axial planes of said reflector and objective thereby preventing projection of rays of light into the upper portion of the projected field.

In testimony whereof I have affixed my signature in the presence of two witnesses.

CHARLES G. MYERS.

Witnesses:

O. C. BILLMAN,

LORENE C. LAW.